Patented June 7, 1932

1,862,253

UNITED STATES PATENT OFFICE

JOHN W. BULLOCK, OF MIAMI, FLORIDA

EPHEDRINE SOLUTION

No Drawing.    Application filed March 10, 1930. Serial No. 434,809.

The present invention relates to ephedrine solutions, and more particularly ephedrine dissolved in a vegetable menstrum.

The vasoconstrictive properties exerted by ephedrine upon the blood vessels of the human system are well known, the substance having been used for many years in China, where it apparently originated, and recently in the United States on an increasing scale.

It is customary to spray the ephedrine solution upon the affected organs, and the solution is specifically useful as a medicine for relieving congestion in the nasal passage.

When used for such a purpose, it is essential that instant relief be given, and moreover that the alleviation of the congestion be sustained.

The solution forming the subject matter of this invention permits the ephedrine to rapidly and completely exert its action, while at the same time the effect is maintained for a considerable period. In fact, it has been proven in actual use that with the application of my solution, the possibility of return of congestion is reduced to a minimum.

This solution is useful for all sorts of catarrhal and congestive conditions in the nasal passage, as well as for affections of the throat.

Various solutions have been employed in recent years, but these have all presented the difficulties of not being stable, of requiring the exercise of great care and expense in the preparation, and moreover have not successfully met the problem of permitting the ephedrine to act rapidly and completely, and at the same time sustain its action over a long period of time.

I have found that if the ephedrine be dissolved in a vegetable menstrum, having a mucilaginous characteristic, such solution will permit a quicker initiation of ephedrine action and more intimate contact of the ephedrine with the mucous membranes of the nose than has heretofore been possible, and the duration of this action will be prolonged and accomplished with a minimum of irritation to the patient.

The vegetable menstrum or mucilaginous solution which I employ, is prepared by dissolving a compound of vegetable origin, in the nature of gum tragacanth, Irish moss, and other similar compounds, in water. It is preferable that the vegetable compound be a demulcent, and readily soluble in the water.

A solution of gum tragacanth in water, varying from one-sixth of one percent to one percent by weight, will provide a sprayable solution for the ephedrine having the necessary mucilaginous characteristic.

Where Irish moss is employed, the same percentage range has been found sufficient.

When the vegetable solution has been thus prepared, the ephedrine, or one of its salts, such as ephedrine hydrochloride or ephedrine sulphate, will be dissolved therein and the preparation will then be complete. The percentage of ephedrine or salt will vary to up to 5% and I have found a 1% solution to be ordinarily satisfactory.

Preferably, I use ephedrine hydrochloride, the white odorless crystals of which are readily soluble in the vegetable solution.

The vegetable compound, namely the gum tragacanth, is a well-known demulcent and imparts viscidity to the solution.

Also the use of this compound makes it possible to have a clear transparent preparation which is distinguished by its mucilaginous characteristic.

The same properties are apparent when Irish moss is employed, this compound having the properties of a demulcent, being particularly effective for bronchial affections and also as a nutritive. As is the case with gum tragacanth, Irish moss produces a clarified transparent liquid preparation, having a mucilaginous characteristic.

In addition to the ephedrine solution comprising the ephedrine, or ephedrine salts, and vegetable compounds in water, I may add to the solution sodium chloride, ⅘%, chlorobutanol, ¾%, eucalyptol, ⅛%, phenol, 1/16% and menthol, ⅛%.

The final preparation, with all of these ingredients present, is a clear fluid, which is easily flowable.

By the use of the mucilaginous solution, which is obtained by incorporating the vegetable substances above outlined, the ephedrine will exert its action upon the mucous membrane with great rapidity, since the gum tragacanth or Irish moss are not insulative, a property which detracts from present oil solutions of ephedrine.

Moreover, the mucilaginous nature of the solution causes it to stick or adhere to the affected parts, and since it is quite fluid, the solution when sprayed will spread and thus treat a relatively large area. Thus a treatment will be of prolonged duration, which will not only aid in alleviating the congestion, but moreover reduce the possibility of the return of the congestion to a minimum.

In addition to the vegetable compounds above named, other compounds having the property of imparting a viscid or mucilaginous characteristic to the solution may be utilized, and I have found that Irish moss and gum tragacanth can be combined if desired. The proportion, however, should be substantially within the range above set forth, namely $1/6\%$ to $1\%$ by weight.

The solution is readily applicable by means of a spray, and its effect is substantially instantaneous.

It is, of course, understood from the literature on this subject that the ephedrine is easily soluble in water, and likewise the vegetable constituents of the solution are all water soluble. This provides a stable solution at all temperatures, which is highly important, since the preparation can be bottled and distributed without fear of precipitation of the ephedrine.

While I prefer to use gum tragacanth and Irish moss, I have also found that such vegetable compounds as gum acacia, agar agar and slippery elm may be employed.

The percentages herein given are, of course, approximative and it will be understood that they may be varied more or less. For instance, I may add more of the vegetable substance if required, but it is undesirable to have an excess of the mucilaginous agent since it will acquire a stickiness which would be objectionable when used in an atomizer.

I claim:

An aqueous solution consisting of substantially 1 to 5% of an ephedrine compound soluble in water, substantially $4/5\%$ sodium chloride, substantially $3/4\%$ chlorobutanol, substantially $1/8\%$ eucalyptol, substantially $1/16\%$ phenol, substantially $1/8\%$ menthol, and $1/6\%$ to $1\%$ of a vegetable gum selected from a group consisting of gum tragacanth, gum acacia, Irish moss and agar agar.

In testimony whereof I have hereunto set my hand.

JOHN W. BULLOCK.